US006838612B2

(12) United States Patent

Krug

(10) Patent No.: US 6,838,612 B2
(45) Date of Patent: Jan. 4, 2005

(54) JOINT ARRANGEMENT FOR GUIDING A CABLE THERETHROUGH

(75) Inventor: Franz Krug, Aalen (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 0 days.

(21) Appl. No.: 10/429,044

(22) Filed: May 5, 2003

(65) Prior Publication Data

US 2003/0211766 A1 Nov. 13, 2003

(30) Foreign Application Priority Data

May 3, 2002 (DE) ........................................ 102 19 970

(51) Int. Cl.$^7$ .......................... H02G 15/24; H02G 4/00

(52) U.S. Cl. ............................... 174/21 JR; 174/84 R; 174/86

(58) Field of Search ................................ 174/74 R, 80, 174/84 R, 86, 18, 19

(56) References Cited

U.S. PATENT DOCUMENTS 3,947,139 A * 3/1976 Feinbloom .................. 403/90
4,834,519 A * 5/1989 Twisselmann .............. 359/384
5,110,224 A * 5/1992 Taylor et al. ................. 385/25
5,289,557 A * 2/1994 Sheinis et al. ........... 292/336.3
5,380,219 A 1/1995 Klier

FOREIGN PATENT DOCUMENTS

DE 26 32 780 3/1978
DE 43 33 913 4/1994

* cited by examiner

*Primary Examiner*—William H. Mayo, III
(74) *Attorney, Agent, or Firm*—Walter Ottesen

(57) ABSTRACT

A joint arrangement for guiding a cable therethrough with a holding body (201) and a leg (204) which is rotatably journalled on the holding body (201) is disclosed. In the joint arrangement, a mechanism for limiting the rotation of the leg relative to the holding body is provided in order to protect a cable passed through the leg and holding body against excessive twisting. The leg (204) is journalled on the holding body (201) with a ball joint (205). Alternatively or additionally, the joint arrangement includes a swivel joint having a sleeve wherein means for limiting rotation are provided in the form of a stop pin and a stop formed on the sleeve or in a sleeve. Electric operator-controlled elements can be movably mounted on a surgical microscope with the joint arrangement.

31 Claims, 5 Drawing Sheets

JOINT ARRANGEMENT FOR GUIDING A CABLE THERETHROUGH

FIELD OF THE INVENTION

The invention relates to a joint arrangement for guiding a cable therethrough and the cable arrangement includes a holding body and a leg which is rotationally movable on the holding body. A mechanism is provided for limiting the rotation of the leg relative to the holding body in order to protect the cable, which is passed through the leg and holding body, against excessive twisting.

BACKGROUND OF THE INVENTION

A joint arrangement of this kind is disclosed in German patent publication 2,643,780. There, a tiltable stand lamp is described which has a ball joint with a cable passthrough guide in the lamp base. A telescope tube arrangement is mounted on this ball joint and a lamp cable is guided therein. Limit pins and limit stops are provided in the telescope tubes in order to prevent an excessive rotation of the telescope tubes relative to each other.

U.S. Pat. No. 5,380,219 discloses a ball joint which can be clamped tight by means of a screw cap. A cable passthrough is configured in the ball joint and a cable hook connector is assigned to the ball joint.

German patent publication 4,333,913 discloses a ball joint having a joint ball wherein an adjusting force for the joint ball can be adjusted in a joint ball socket.

SUMMARY OF THE INVENTION

It is an object of the invention to provide a joint arrangement for guiding a cable therethrough which is suitable for the attachment of an electric operator-controlled element on a medical optical apparatus to thereby provide a wide range of actuating positions for the operator-controlled element to the optical apparatus which all ensure a reliable operation of the medical optical apparatus.

The joint arrangement of the invention is for guiding a cable therethrough. The joint arrangement includes: a holding body; a leg; a ball joint for rotatably journalling the leg in the holding body; the holding body and the leg defining a path for guiding the cable through the joint arrangement; and, limit means for limiting the rotation of the leg relative to the holding body to protect the cable against excessive twisting.

In the joint arrangement of the invention, a leg is journalled on a holding body with a ball joint. In another embodiment, a joint arrangement includes a rotational joint with which the leg is journalled on the holding body which includes a sleeve and this sleeve is journalled in a sleeve receptacle on the holding body and is fixedly connected to the leg. On the outer periphery of the sleeve, a slot is formed wherein a stop pin engages for providing a rotation-limiting action. The stop pin is configured on the sleeve receptacle. In still another embodiment of a joint arrangement, a rotational joint having a sleeve is provided. The sleeve is journalled in a sleeve receptacle on a holding body and is fixedly connected to a leg. A stop pin is provided on the outer periphery of the sleeve and projects into a slot formed in the sleeve receptacle to effect a limiting of rotation.

In this way, a joint arrangement is provided wherein joint movements only cause slight mechanical loading for a passed-through electric cable. In this way, the reliability of an electric system connected to such a cable is ensured because cable damage because of material fatigue and short circuits is avoided. Such short circuits arise because of a tearing of the insulating material.

In a further embodiment of the invention, the cable arrangement includes a ball joint having a joint ball which is fixedly connected to the leg and is accommodated in a joint ball socket formed on the holding body. In this way, a compact joint arrangement is provided whose surface is easily cleaned.

In still another embodiment of the invention, the ball joint includes a joint ball socket which is fixedly connected to the leg and accommodates a joint ball configured on the holding body. In this way, a joint arrangement having a large degree of freedom is provided which permits a long displacement path.

In another embodiment of the invention, one or several stop pins are provided on the joint ball. One or several stop lugs are configured in the joint ball socket and assigned to the stop pins for providing a rotation-limiting action.

In another embodiment of the invention, one or several recesses are provided in the joint ball wherein one or several stop pins project to effect a rotation-limiting action. The stop pins are configured in the joint ball socket. In this way, a joint arrangement having a precise limiting of rotation is provided.

In a further embodiment of the invention, a bore for passing a cable therethrough is formed in the joint ball. In this way, a cable passthrough is provided wherein an adjustment of the joint arrangement causes only a minimum movement of the cable.

The joint ball is made of steel in another embodiment of the invention. A sleeve can also be provided in the joint arrangement and this sleeve is likewise made of steel. Preferably, the steel for the joint ball and/or the sleeve is one of the following type: X 45 Cr 13, X 46 Cr 13 or X 65 Cr 13. In this way, a robust joint arrangement with good workability is provided because the surfaces of such a joint ball and such a sleeve are hard and can therefore not be damaged easily.

According to another embodiment of the invention, the holding body is made of aluminum and, in this way, a joint arrangement having low inherent weight is provided. Furthermore, different materials of the holding body and joint ball and/or sleeve ensure good workability and a blocking or jamming is precluded.

In another embodiment of the invention, means are provided on the holding body for adjusting a joint force on the ball joint. In other embodiment of the invention, means for adjusting the clamp force on the swivel joint are provided on the holding body. In this way, a force for adjusting the joint arrangement can be varied.

A surgical microscope having an electric operator-controlled element, which is attached to the microscope via such a joint arrangement, makes it possible that the operator-controlled elements are mountable so that they are especially user friendly.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
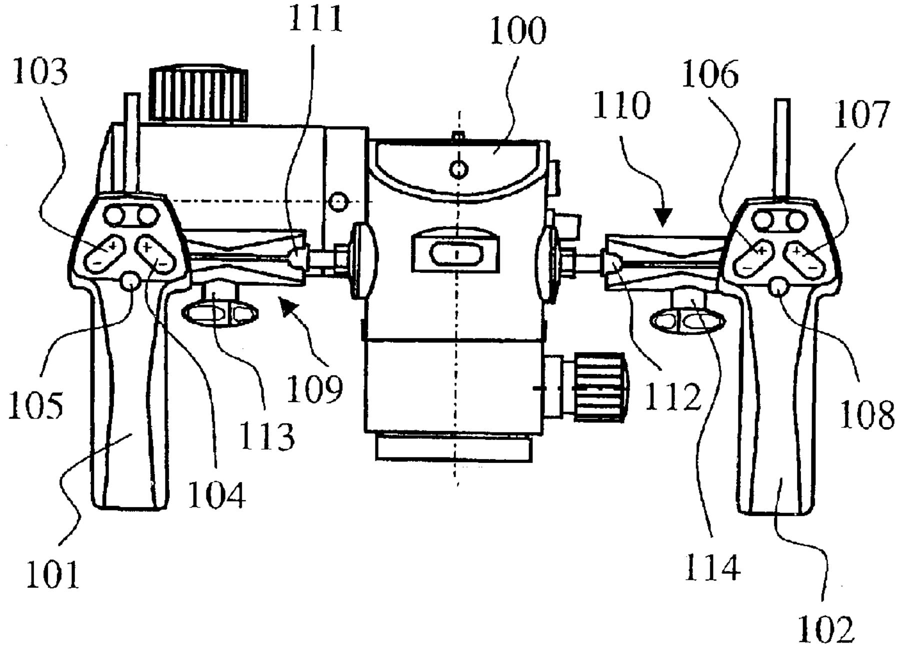
FIG. 1 is a schematic showing a surgical microscope having first and second operator-controlled elements which are attached to the tube of the surgical microscope via a joint arrangement according to the invention.

FIG. 1 shows a surgical microscope 100 which is attached to a stand (not shown) so as to be movable. The surgical microscope 100 has operator-controlled elements (101, 102) which are configured as handles and which include electric switches (103, 104, 105) and (106, 107, 108), respectively. With these switches, microscope functions such as focusing, zooming or varying illumination are controlled. The operator-controlled elements (101, 102) are attached to the surgical microscope 100 via respective joint arrangements 109 and 110. In these joint arrangements, electric cables are guided from the surgical microscope to the electric operator-controlled elements 101 and 102. The joint arrangements 109 and 110 include respective ball joints 111 and 112 as well as a rotational joint. The rotational joints are covered by the respective operator-controlled elements 102 and 103 in FIG. 1.

Each of the joint arrangements 109 and 110 has a clamp screw with a rotatable handle (113, 114) by means of which a clamp force for the joint arrangement can be adjusted. In this way, a release or fixing of the joint arrangements 109 and 110 is made possible. With a fixed joint arrangement 109 or 110, the surgical microscope 100 can be moved over a patient in that a force is applied to a corresponding operator-controlled element. The surgical microscope 100 is mounted on a stand (not shown).

Figure 2:
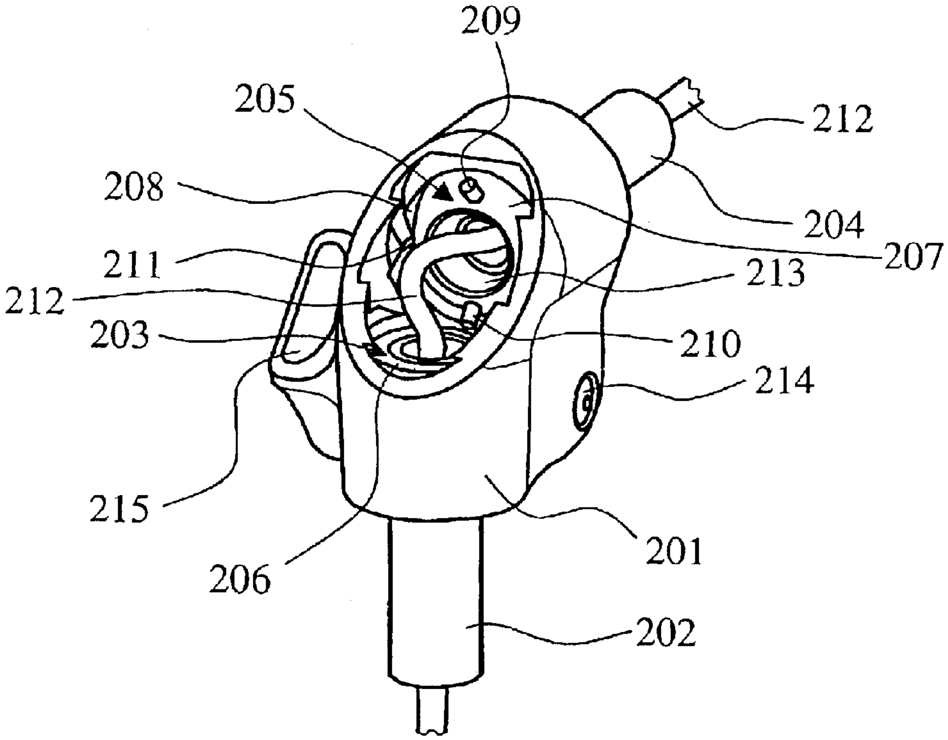
FIG. 2 is a perspective view of the joint arrangement of the invention wherein a region of the holding body is exposed in order to provide a view of a cable passed through the joint arrangement.

In FIG. 2, the joint arrangement 110 of FIG. 1 is shown in a perspective view. The joint arrangement has a holding body 201 which rotatably holds a leg 202 via a rotational joint 203 and a leg 204 via a ball joint 205. The rotational joint 203 has a sleeve 206 which is made of steel, preferably a steel of the type X 46 Cr 13. The leg 202 is threadably engaged in the sleeve 206 and is glued. The sleeve 206 is rotatably journalled in a sleeve receptacle configured on the holding body 201.

The ball joint 205 has a joint ball 207 which is made of steel, preferably of the steel type X 45 Cr 13. The joint ball 207 is journalled in a joint ball receptacle 208 formed on the holding body 201. Stop pins 209 and 210 are seated in the joint ball 207. A stop 211 on the holding body 201 is assigned to these stop pins 209 and 210. This stop limits the possible movement of the joint ball 207 in the joint ball socket 208.

The legs 202 and 204 are configured to be hollow and accommodate an electric cable 212. The leg 202 is threadably engaged in the sleeve 206 and glued as is the leg 204 in the joint ball 207.

The joint ball 207 has a bore 213 which, with the leg 204, defines a cable guide channel for the cable 212.

The holding body 201 is configured to have a slit. A pretensioning clamp screw 214 is mounted in the holding body 201 and a clamp force can be applied to the sleeve 206 of the rotational joint 203 and the joint ball 207 of the ball joint 205 by means of the clamp screw 214. Furthermore, a clamp screw having a rotatable handle 215 is provided on the holding body 201. The rotatable handle 215 makes possible a fine adjustment for the workability of the rotational joint and ball joint.

Figure 3:
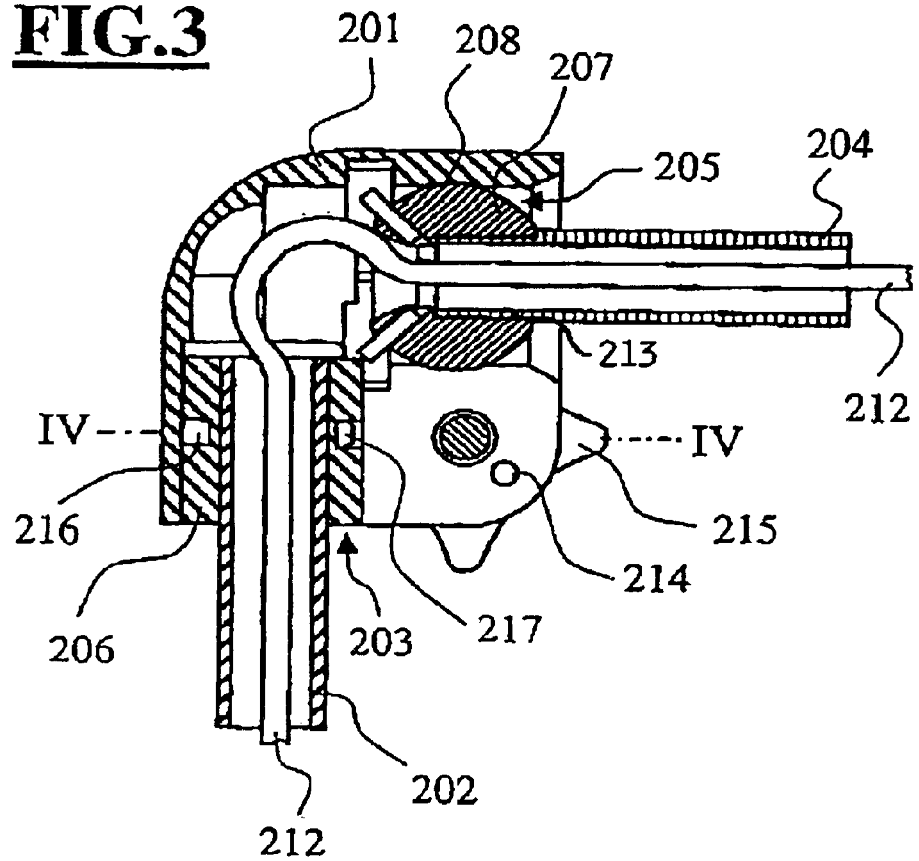
FIG. 3 is a side elevation view, in section, of the joint arrangement of FIG. 2.

FIG. 3 shows a section view of the joint arrangement of FIG. 2. The components of FIG. 3 which are the same as those in FIG. 2 are provided with identical reference numerals. The joint ball socket 208 for the ball joint 205 is configured in a comparatively small region on the holding body 201. This region contains the joint ball 207 having a surface which corresponds approximately to only one fifth of the surface of the joint ball 207.

The joint ball 207 has a bore 213 which defines a cable guide channel. The bore 213 is configured to have a bore radius which increases toward the ball surface so that the electric cable, which passes through the joint arrangement, is not subjected to any sharp surfaces which could damage an electric cable when there is a displacement of the ball joint.

An annularly-shaped slot 216 is formed on the sleeve 206 of the rotational joint 203. This annularly-shaped slot 216 encloses the sleeve 206 except for a strut (not shown in FIG. 3). A threaded bolt 217, which is screwed into the holding body 201, engages this annularly-shaped slot 216. The threaded bolt 217 defines a stop for the strut to operate as a mechanism for limiting rotation. This mechanism for limiting rotation is explained in greater detail with respect to FIG. 4.

Figure 4:
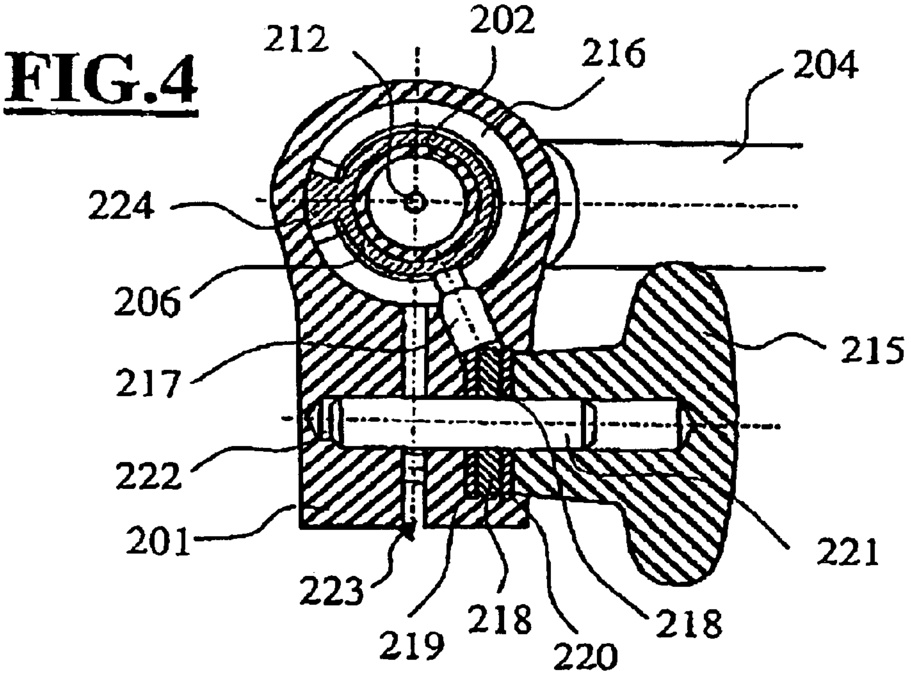
FIG. 4 is a section view taken along line IV—IV of FIG. 3.

FIG. 4 shows a section view of the joint arrangement of FIG. 3 along line IV—IV. The components in FIG. 4 which correspond to those in FIGS. 2 and 3 are identified by the same reference numerals.

In the joint arrangement, the pretensioning clamp screw 214 is mounted offset radially outwardly with respect to the clamp screw 221. The slot 216 in the sleeve 206 is limited by a V-shaped lug 224. A threaded chuck is provided for the threaded bolt 217 in the holding body 201. The threaded bolt extends relative to the sleeve 206 in the radial direction and is mounted in the region of a needle bearing 218 for the handle 215 of the clamp screw. The needle bearing 218 is held between two support discs 219 and 220. A clamp screw 221 is fixed in the handle 215. By rotating the handle 215, the clamp screw 221 can be screwed into and out of a thread 222 in the holding body. In this way, it is possible to vary the width of the slit 223 in the holding body with the clamp screw 221 as well as with the pretensioning clamp screw 214, whereby a clamp force is applied to the sleeve 206 of the swivel joint 203 and the joint ball 207 in the joint ball socket 208 for the ball joint.

Figure 5:
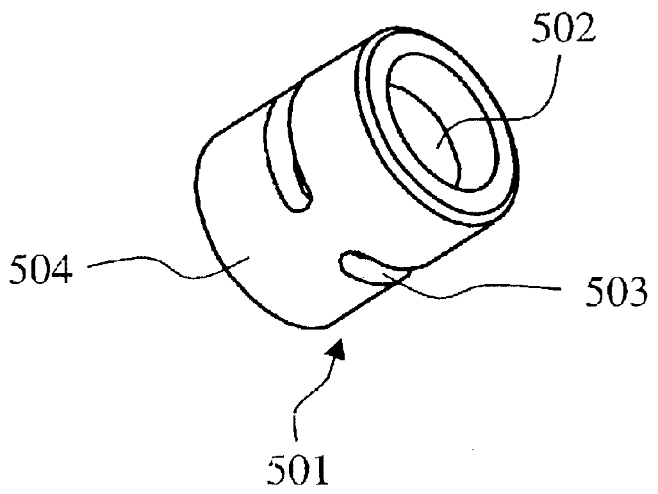
FIG. 5 is a perspective view of a sleeve having a slot in the joint arrangement of FIGS. 2, 3 and 4.

FIG. 5 shows a perspective view of the sleeve in the swivel joint 203 of FIG. 3. The sleeve 501 has a thread 502 on the inner side thereof in which the corresponding leg is threadably engaged and can be glued. A slot 503 having a lug 504 is configured in the outer region of the sleeve 501. The lug 504 functions as a stop for the threaded bolt 217 of FIG. 4.

Figure 6:
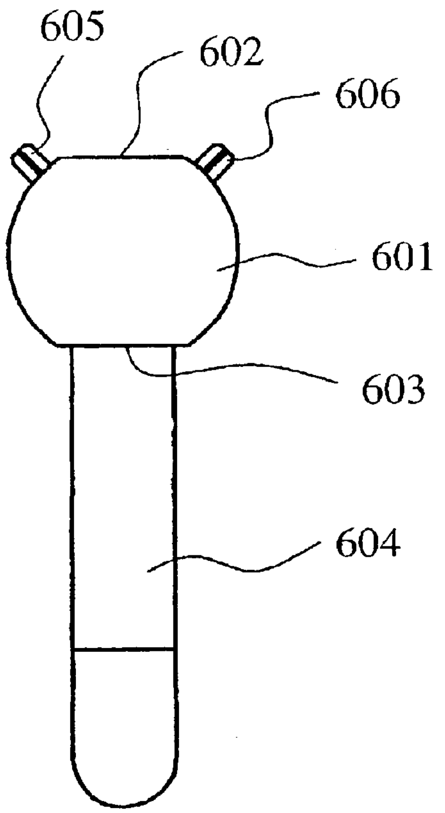
FIG. 6 is a schematic showing a joint ball having a leg and stop lug for the joint arrangement of FIGS. 2 to 4.

FIG. 6 shows a joint ball 207 with a corresponding leg and the stop pins in the joint arrangement explained with respect to FIGS. 2 to 4. The joint ball 601 has flats at two opposite-lying faces 602 and 603. The joint ball 601 has a threaded bore in which legs 604 are threadably engaged and glued. The stop pins 605 and 606 are seated in bores which are configured on the curved surface of the joint ball 601. The stop pins are seated in these bores and are glued.

Figure 7:
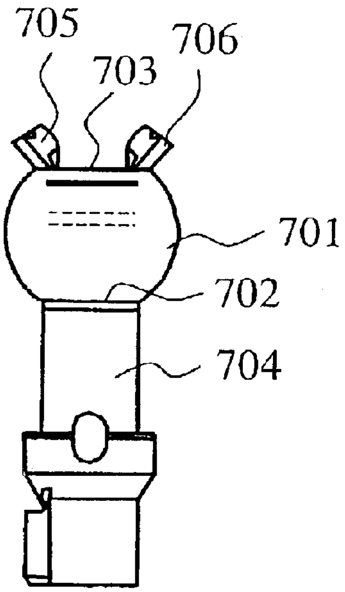
FIG. 7 is an alternate embodiment of a leg with a joint ball and stop lug for a cable passed through a ball joint.

An alternate embodiment for a joint ball with a leg for use in a corresponding joint arrangement for a cable passthrough is shown in FIG. 7. In this embodiment, the joint ball 701 has flats on a first end face 702 and on a second end face 703. The dimensions of the first end face are adapted to the diameter of a leg 704. The joint ball 701 has an inner thread in which the leg 704 threadably engages and is glued on the side of the first end face 702. On the side of the second end face, a wing screw is threadably engaged and glued and has bar-shaped wings 705 and 706. The wing screw is hollow and comprises a threaded ring having an outer thread which fits into the internal thread of the joint ball 701. The bar-shaped wings 705 and 706 act as stop members which spread outwardly as viewed from the center of the joint ball 701. These stop members are tapered in the direction of the second end face 703 of the joint ball 701.

Figure 8:
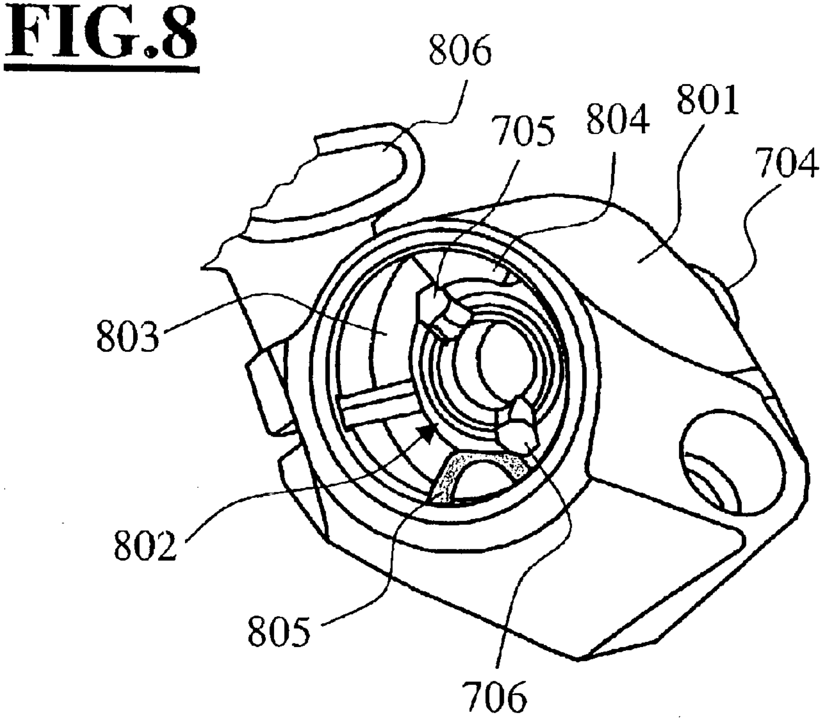
FIG. 8 is a three-dimensional section view of a holding body of a joint arrangement which has a joint ball with a stop lug of FIG. 7; and, FIG. 9 is an alternate embodiment for a joint ball in a ball joint wherein a limiting of rotation takes place via a stop pin which is fixed in a joint ball socket and projects into a recess in the joint ball.

FIG. 8 shows a perspective view of an alternate embodiment for the joint arrangement having a joint ball of FIG. 7. The components in FIG. 8 which are the same as in FIG. 7 are identified by the same reference numerals. The joint arrangement has a holding body 801 wherein a ball joint 802 with a joint ball socket 803 is formed. For the joint ball socket 803, two stops 804 and 805 are provided for bar-shaped stop members 705 and 706 of a joint ball according to FIG. 7. These stops limit the displacement of the ball joint 802. In the joint arrangement, all edges in the region of the cable passthrough 806 are flattened. In this way, damage to a passed-through cable when adjusting the ball joint is avoided. Furthermore, it is ensured hereby that the joint ball does not jam in the holding body notwithstanding the mechanism for limiting rotation.

Figure 9:
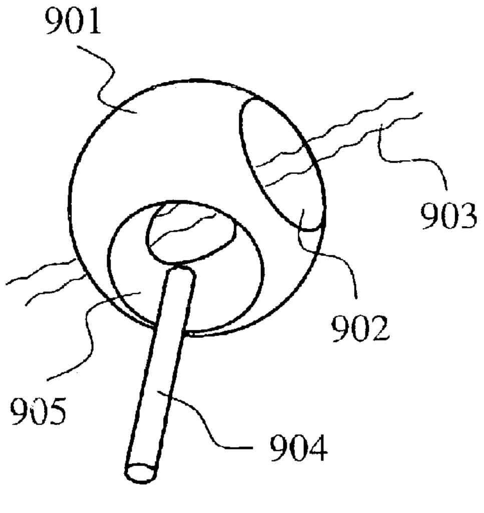

FIG. 9 shows a further alternate embodiment for a rotation-limited ball joint in a joint arrangement with a cable guided therethrough. In this ball joint, a joint ball 901 having a pass-through bore 902 is provided as a cable guide channel for an electric cable 903. This joint ball 901 is accommodated in a joint ball socket (not shown) in a holding body. At least one stop pin 904 is provided on the holding body in the region of the joint ball socket and this pin is fixed on the corresponding holding body. This stop pin projects into a conically configured recess 905 in the joint ball 901. The recess 905 and the stop pin 904 limit the movability of the joint ball 901 and thereby fix the displacement path for the corresponding ball joint.

The described joint arrangements can be configured also with two rotation-limited swivel joints or two rotation-limited ball joints. In lieu of a screw and adhesive connection for the leg and joint ball or sleeve, only a screw connection or even a clamp, solder or weld connection for the components is possible. In surgical microscopes, which are equipped with electric operator-controlled units, and which are connected to a surgical microscope base body having such joint arrangements, an ergonomic position for the operator-controlled element is adjustable for each possible position of the surgical microscope.

It is understood that the foregoing description is that of the preferred embodiments of the invention and that various changes and modifications may be made thereto without departing from the spirit and scope of the invention as defined in the appended claims.

What is claimed is:

1. A joint arrangement for guiding a cable therethrough, the joint arrangement comprising:

a holding body;

a leg;

a ball joint for rotatably journalling said leg in said holding body;

said holding body and said leg defining a path for guiding said cable through said joint arrangement; and, limit means for limiting the rotation of said leg relative to said holding body to protect said cable against excessive twisting.

2. The joint arrangement of claim 1, wherein said ball joint includes a ball fixedly connected to said leg; and, said holding body has a ball socket formed therein for holding said ball so as to permit said ball to rotate in said socket.

3. The joint arrangement of claim 2, wherein said limit means comprises at least one stop pin provided on said ball and at least one stop lug for coacting with said stop pin for limiting said rotation.

4. The joint arrangement of claim 2, wherein said limit means includes at least one recess formed in said ball and at least one stop lug coacting with said recess to limit said rotation.

5. The joint arrangement of claim 2, wherein said path includes a bore in said ball.

6. The joint arrangement of claim 2, wherein said ball is made of steel.

7. The joint arrangement of claim 6, wherein said steel is of the type X 46 Cr 13.

8. The joint arrangement of claim 1, wherein said ball joint includes a ball socket connected to said leg; and a ball is, formed on said holding body and accommodated in said ball socket.

9. The joint arrangement of claim 8, wherein said limit means comprises at least one stop pin provided on said ball and at least one stop lug for coacting with said stop pin for limiting said rotation.

10. The joint arrangement of claim 8, wherein said limit means includes at least one recess formed in said ball and at least one stop lug coacting with said recess to limit said rotation.

11. The joint arrangement of claim 8, wherein said path includes a bore in said ball.

12. The joint arrangement of claim 8, wherein said ball is made of steel.

13. The joint arrangement of claim 12, wherein said steel is of the type X 46 Cr 13.

14. The joint arrangement of claim 1, wherein said holding body is made of aluminum.

15. The joint arrangement of claim 1, further comprising means for adjusting a clamping force on said ball joint.

16. The joint arrangement of claim 1, wherein the ball joint can be rotated in said leg in a way that causes twisting of said cable in the joint arrangement.

17. A joint arrangement for guiding a cable therethrough, the joint arrangement comprising:

a holding body;

a leg;

a rotational joint for rotatably journalling said leg in said holding body;

said holding body and said leg defining a path for guiding said cable through said joint arrangement;

limit means for limiting the rotation of said leg relative to said holding body to protect said cable against excessive twisting;

said holding body having a sleeve receptacle;

said rotational joint including a sleeve fixedly connected to said leg and journalled in said sleeve receptacle;

said sleeve having an outer side and a slot formed in said outer side; and, said sleeve receptacle having at least one stop lug formed thereon for coacting with said slot to limit said rotation.

18. The joint arrangement of claim 17, wherein said sleeve is made of steel.

19. The joint arrangement of claim 18, wherein said steel is of the type X 46 Cr 13.

20. The joint arrangement of claim 17, wherein said holding body is made of aluminum.

21. The joint arrangement of claim 17, further comprising means for adjusting a clamping force on said rotational joint.

22. A joint arrangement for guiding a cable therethrough, the joint arrangement comprising:

a holding body;

a leg;

a rotational joint for rotatably journalling said leg in said holding body;

said holding body and said leg defining a path for guiding said cable through said joint arrangement;

limit means for limiting the rotation of said leg relative to said holding body to protect said cable against excessive twisting;

said holding body having a sleeve receptacle;

said rotational joint including a sleeve fixedly connected to said leg and journalled in said sleeve receptacle;

said sleeve receptacle having a slot formed therein; and, said sleeve having an outer side and a lug formed on said outer side for projecting into said slot to coact therewith to limit said rotation.

23. The joint arrangement of claim 22, wherein said sleeve is made of steel.

24. The joint arrangement of claim 23, wherein said steel is of the type X 46 Cr 13.

25. The joint arrangement of claim 22, wherein said holding body is made of aluminum.

26. The joint arrangement of claim 22, further comprising means for adjusting a clamping force on said rotational joint.

27. A surgical microscope assembly comprising:

a surgical microscope incorporating mechanisms for carrying out functions thereof;

an electric operator-controlled element incorporating means for actuating said mechanisms;

a joint arrangement for connecting said operator-controlled element to said surgical microscope and for guiding an electric cable therethrough for interconnecting said actuating means to said mechanisms; and, said joint arrangement including: a holding body; a leg; a ball joint for rotatably journalling said leg in said holding body; said holding body and said leg defining a path for guiding said cable through said joint arrangement; and, limit means for limiting the rotation of said leg relative to said holding body to protect said cable against excessive twisting.

28. A joint arrangement for guiding a cable therethrough, the joint arrangement comprising:

a holding body;

a leg;

a ball and socket joint for rotatably journalling said leg in said holding body;

said holding body and said leg defining a path for guiding said cable through said joint arrangement; and, limit means for limiting the rotation of said leg relative to said holding body to protect said cable against excessive twisting.

29. A surgical microscope assembly comprising:

a surgical microscope incorporating mechanisms for carrying out functions thereof;

an electric operator-controlled element incorporating means for actuating said mechanisms;

a joint arrangement for connecting said operator-controlled element to said surgical microscope and for guiding an electric cable therethrough for interconnecting said actuating means to said mechanisms; and, said joint arrangement including: a holding body; a leg; a ball and socket joint for rotatably journalling said leg in said holding body; said holding body and said leg defining a path for guiding said cable through said joint arrangement; and, limit means for limiting the rotation of said leg relative to said holding body to protect said cable against excessive twisting.

30. A surgical microscope assembly comprising:

a surgical microscope incorporating mechanisms for carrying out functions thereof;

an electric operator-controlled element incorporating means for actuating said mechanisms;

a joint arrangement for connecting said operator-controlled element to said surgical microscope and for guiding an electric cable therethrough for interconnecting said actuating means to said mechanisms; and, said joint arrangement including:

a holding body;

a leg;

a rotational joint for rotatably journalling said leg in said holding body;

said holding body and said leg defining a path for guiding said cable through said joint arrangement;

limit means for limiting the rotation of said leg relative to said holding body to protect said cable against excessive twisting;

said holding body having a sleeve receptacle;

said rotational joint including a sleeve fixedly connected to said leg and journalled in said sleeve receptacle;

said sleeve having an outer side and a slot formed in said outer side; and, said sleeve receptacle having at least one stop lug formed thereon for coacting with said slot to limit said rotation.

31. A surgical microscope assembly comprising:

a surgical microscope incorporating mechanisms for carrying out functions thereof;

an electric operator-controlled element incorporating means for actuating said mechanisms;

a joint arrangement for connecting said operator-controlled element to said surgical microscope and for guiding an electric cable therethrough for interconnecting said actuating means to said mechanisms; and, said joint arrangement including:

a holding body;

a leg;

a rotational joint for rotatably journalling said leg in said holding body;

said holding body and said leg defining a path for guiding said cable through said joint arrangement;

limit means for limiting the rotation of said leg relative to said holding body to protect said cable against excessive twisting;

said holding body having a sleeve receptacle;

said rotational joint including a sleeve fixedly connected to said leg and journalled in said sleeve receptacle;

said sleeve receptacle having a slot formed therein; and, said sleeve having an outer side and a lug formed on said outer side for projecting into said slot to coact therewith to limit said rotation.

* * * * *